3 Sheets—Sheet 1.

W. M. JEWELL.

Assignor, by mesne assignments, to J. A. McAnulty and S. W. Sperry.

AUTOMATIC SHELF FEEDER.

No. 10,933. Reissued May 29, 1888.

Witnesses:

Harry L. Amer.

F. A. Hoffmann

Inventor.

William M. Jewell.

Per J. A. McAnulty.

Atty.

N. PETERS, Photo-Lithographer, Washington, D. C.

W. M. JEWELL.

Assignor, by mesne assignments, to J. A. McAnulty and S. W. Sperry.

AUTOMATIC SHELF FEEDER.

No. 10,933. Reissued May 29, 1888.

Witnesses:

Harry L. Amer.
F. A. Hoppaus

Inventor.

William M. Jewell.
Per J. A. McAnulty.
Atty.

N. PETERS, Photo-Lithographer, Washington, D. C.

3 Sheets—Sheet 3.

W. M. JEWELL.

Assignor, by mesne assignments, to J. A. McANULTY AND S. W. SPERRY.

AUTOMATIC SHELF FEEDER.

No. 10,933. Reissued May 29, 1888.

WITNESSES:

Harry L. Amew.

F. A. Stoppenbach

INVENTOR.

William M. Jewell.

Per J. A. McAnulty, Atty.

N. PETERS, Photo-Lithographer, Washington, D. C.

UNITED STATES PATENT OFFICE.

WILLIAM M. JEWELL, OF PINE, ASSIGNOR, BY MESNE ASSIGNMENTS, TO J. A. McANULTY, OF DENVER, COLORADO, AND SIMON W. SPERRY, OF STOCKTON, CALIFORNIA.

AUTOMATIC SHELF-FEEDER.

SPECIFICATION forming part of Reissued Letters Patent No. 10,933, dated May 29, 1888.

Original No. 298,387, dated May 13, 1884. Application for reissue filed January 15, 1886. Serial No. 188,694.

*To all whom it may concern:*

Be it known that I, WILLIAM M. JEWELL, of Pine, in the county of Jefferson and State of of Colorado, late of Denver, Colorado, have invented certain new and useful Improvements in Automatic Shelf-Feeders for Middlings-Purifiers and Roller-Mills; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates particularly to that class of feeders that are self-acting under the weight of material flowing through the feeding mechanism.

The object of my invention is to provide a shelf-feeder for middlings-purifiers, and roller and other mills or machinery, whereby a stream of varying volume may be spread out into a sheet of even thickness throughout its length, and which may also be used for feeding a given quantity.

The device herein described is operated either automatically, by the varying weight of stock flowing into the hopper, or mechanically held in position to deliver a given stream, all as will now be more fully described.

Figure 1:
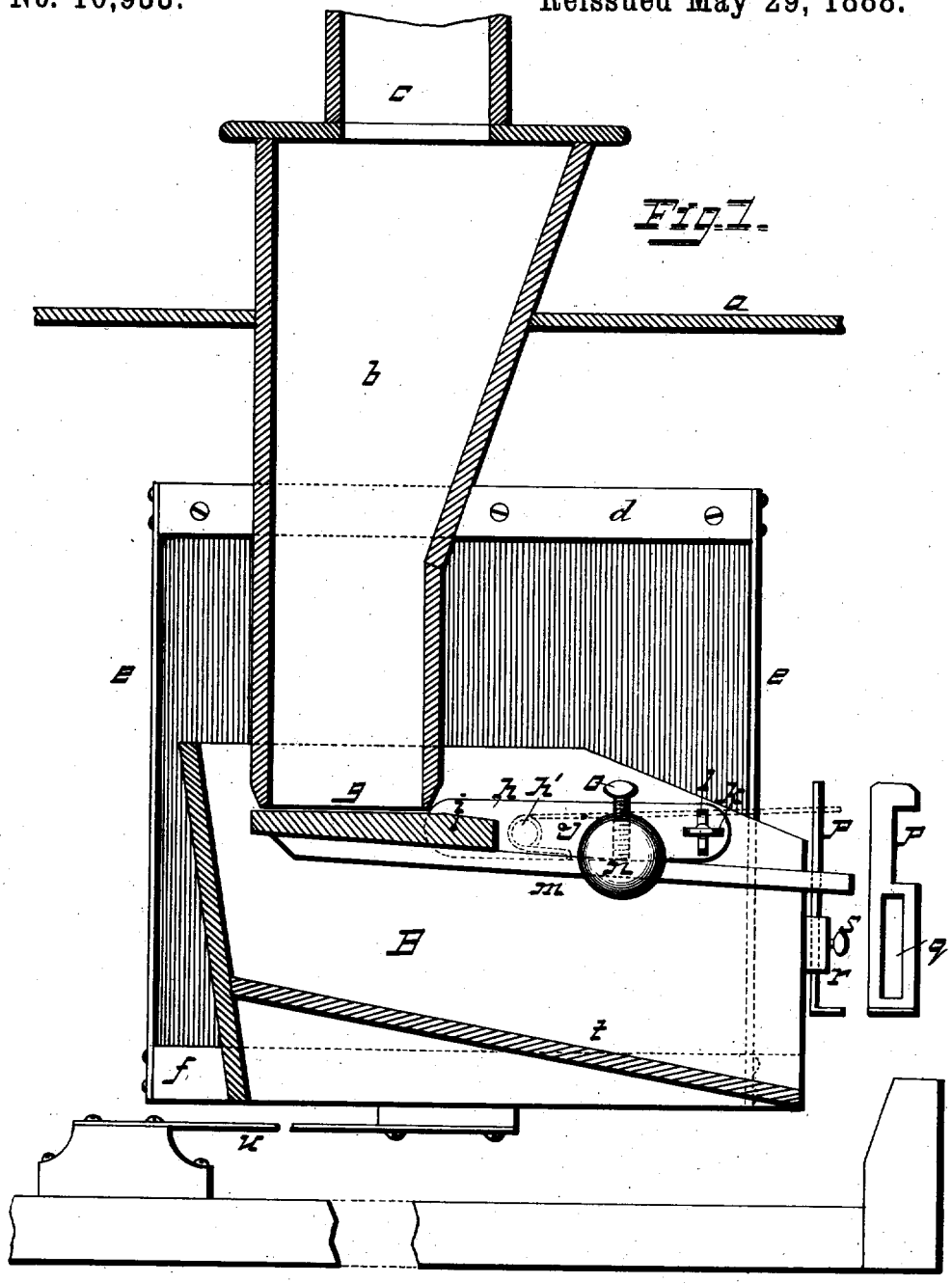
Figure 2:
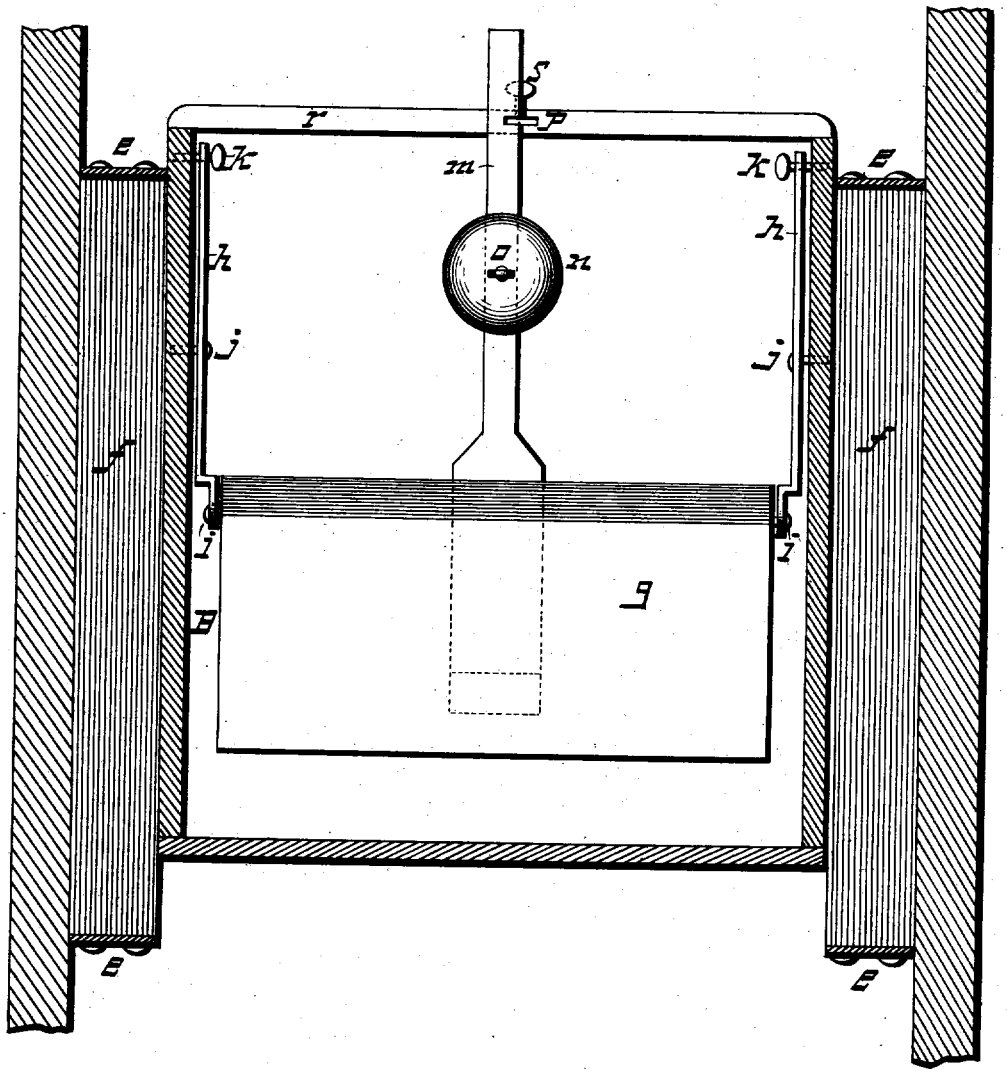
Figure 3:
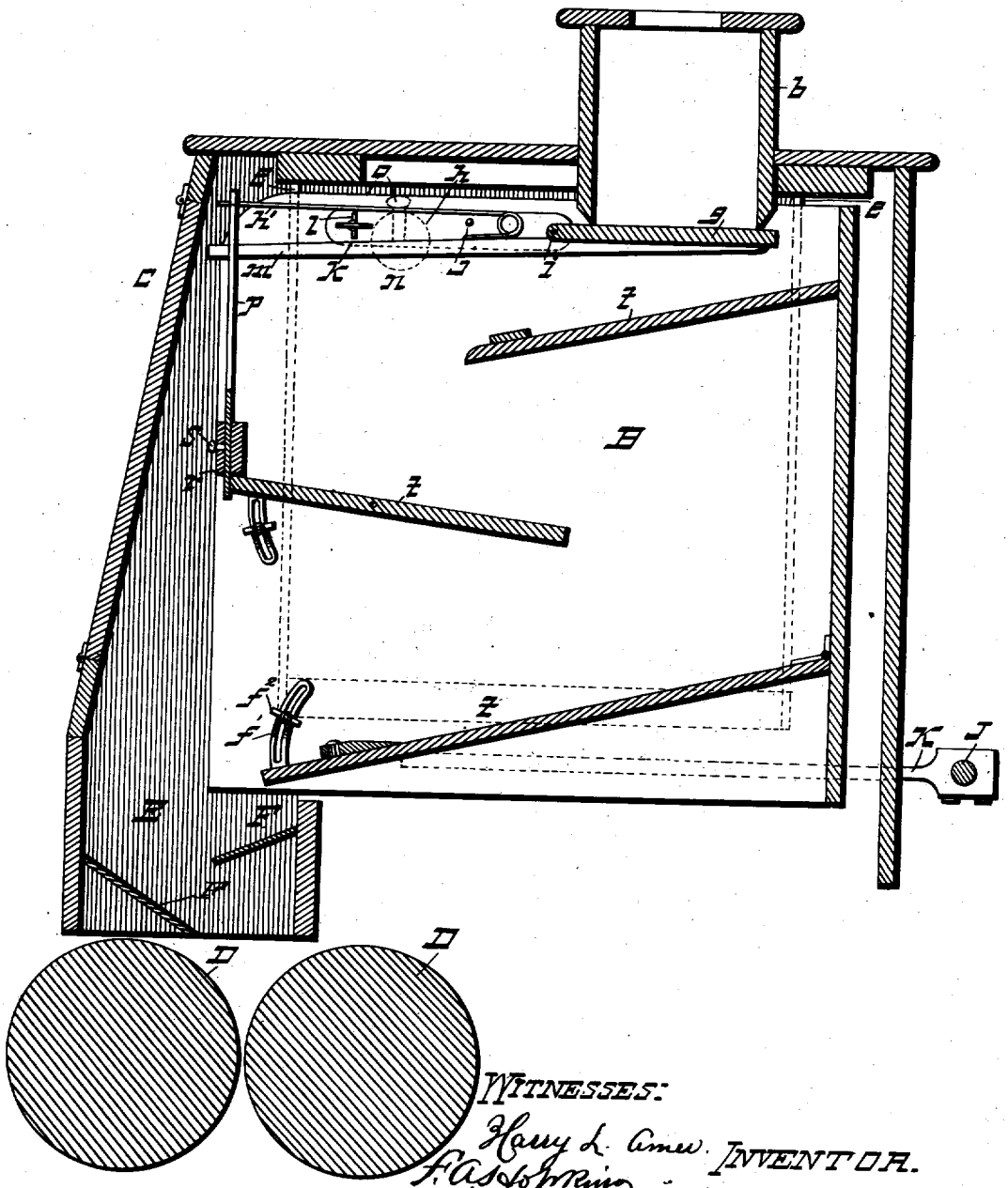

In the accompanying drawings, in the several figures of which like parts are similarly designated, Figure 1 is a vertical section of my feed mechanism as adapted to a middlings-purifier. Fig. 2 is a horizontal section on a line just above the level of the feeder-shelf, and Fig. 3 is a vertical section of my feed mechanism adapted for roller-mills.

The letter *a* may designate the top boards of a middlings-purifier, and *b* a hopper or chute, suitably arranged therein, with a spout, *c*, leading into said hopper. The hopper will be arranged in accordance with the requirements of the machine to which it is applied.

*d d* are horizontal bars attached to the walls of the purifier at the point of entrance of the feed-hopper. From the ends of these bars depend spring-straps *e e*, to the lower ends of which are fastened horizontal bars *f*, and these bars support the "shaking-frame" B. The discharge end of the hopper projects into the shaking-frame, substantially as shown, and has its discharge-opening closed by a pivoted or hinged shelf, *g*. This shelf is hinged or pivoted to arms *h h* at *i*, and said arms are pivoted at *j* to the walls of the shaking-frame, and are held in any given adjustment on their pivots by set-screws *k*, which extend into the walls of the shaking-frame through slots $l^0$ in said arms, so that the proximate relation of the shelf to the hopper may be varied. The shelf is provided with means for holding it normally up against and closing the discharge end of the hopper, and I have shown such means as an arm, *m*, provided with a movable counterpoise, *n*, held to its adjustment on said arm by a set-screw, *o*. This construction thus affords a yielding support for the stock in the hopper. The motion of said shelf may be limited when a positive feed is required by the engagement of a stop-hook, *p*, with the arm *m*. This stop-hook has a slot, *q*, and is arranged in a bar, *r*, wherein it is movable. A set-screw, *s*, passing into the bar through the slotted hook *p*, clamps the hook in any position. The arm *m* is attached to the shelf *g* and moves with it, its weight being adjusted to permit the shelf to automatically drop when the required quantity of material has accumulated upon the feeder-shelf. Thus the quantity to be fed may be regulated with great nicety.

The shaker B may have one or more shelves, *t*, corresponding, if desired, in construction and function with the shelves *b c d* of my Patent No. 280,184, or of other approved form. The discharge end of the shaker B is open, the bar *r* simply extending across it at that end at a suitable non-interfering distance. The desired shaking motion is imparted to the shaker B in a middlings-purifier by connections *u*, with its shaking-screen, for example, although I do not necessarily limit my invention to such specified connection for getting a shaking or vibratory movement.

In the form of feed mechanism shown in Fig. 3, *b* is the hopper; B, the shaker; C, the casing inclosing the same, and D D a pair of grain-grinding rolls, arranged in any of the approved forms. E is a spout, arranged to deliver the grain to the rolls over equalizing-shelves F F, projecting at an incline from opposite sides of said spout. *t t t* are spreading shelves or boards, projecting at inclines from opposite sides of the shaker B, and corresponding in construction and function with the shelves *c b* and board *d* of my Patent No. 280,184 of June 26, 1883, and similarly equipped, if desired. J is a shaft, suitably borne by the framing and driven as by a belt, from, say, the shaft of the fast-roll of the pair of rolls D D. This shaft may have a crank or an eccentric, with which the rod or pitman K is connected, and said pitman then connected with the shaker to impart to it a shaking or vibratory motion.

A spring, *h*, (shown in dotted lines, Fig. 1, and full lines, Fig. 3,) may be substituted for the weight, and the resistance of such spring is governed by the adjustment of the hook *p*, with which it engages.

The lowermost shelf *t* of the shaker-frame may be made adjustable at its lower end in several ways to insure uniform distribution of the materials to be treated when the relative levels of any of the parts are disturbed. As one illustration of means for effecting this, I have shown in Fig. 3 said shelf *t*, provided with a slotted segment, $f'$, held to the side of the shaker by a thumb-nut and bolt, $f^2$. As the shelf is thin, by using its hinges as fulcra its discharge end can be sprung and held by the segment and thumb-nut in any desired position to adapt the feed to the position of the rollers or purifier. The segment and thumb-nut shown on the middle shelf *t* is to vary the inclination of said shelf, which is pivoted near its center, as in my patent referred to.

The operation of the machine is as follows: The material to be fed is received into the hopper through the spout C. If it is desired to deliver such stream of stock to the crushing or separating machine beneath as fast as received into the hopper, the arm *m* is allowed free action by placing the stop *p* in such a position as not to interfere with the rising and falling motion of said arm. The weight *n* is then fastened upon the bar *m* a sufficient distance from the hinged or pivoted shelf *g* to hold it close up against the hopper bottom, as shown in Fig. 1, until a sufficient quantity of stock has accumulated upon the feeder-shelf to substantially cover the hopper bottom, when the weight of the counterpoise *n* will be sufficiently overcome and raised upward to lower the discharge edge of the feeder-shelf sufficiently to allow of the escape of as great a quantity of material from the hopper as is being received into the same through the stock-spout C.

When it is desired to feed out of the hopper only a given quantity in a continuous stream, the stop *p* is set to limit the upward movement of the arm *m*, and in this way the size of the discharge-opening may be suitably regulated to constantly feed out a stream of stock of like volume.

Whenever it is necessary to cut off the feed, the stop *p* is lowered into contact with the arm *m*, thus holding the feeder-shelf closed against the lower end of the hopper and preventing the escape of stock therefrom.

Inasmuch as the hopper-closing shelf *g* is borne by the shaker B, said shelf has a motion across the discharge end of the hopper; hence it must follow that the agitation incident thereto will put the material being fed in motion, and thus serve to insure its descent or discharge, preventing clogging of the hopper and a fitful supply to the treating mechanism.

What I claim is—

1. The combination, substantially as shown and described, of a stationary hopper, a frame provided with spreading-shelves, means to vibrate or shake such frame, and a shelf pivoted in said frame at the discharge end of said hopper, and provided with a counterbalancing device to render it automatic, and a hook to engage said shelf to limit its range of movement, as and for the purpose set forth.

2. The combination, substantially as shown and described, of the stationary hopper, the shaker suspended beneath it, the shelf for closing the discharge end of said hopper pivoted in said shaker and moving with it, means, as set forth, for vibrating said shaker, the adjustable counterbalancing mechanism connected with said shelf to vary its resistance, and means, substantially as specified, for limiting the fall of the shelf and for positively preventing its fall, as and for the purpose described.

3. In a middlings-purifier or roller-mill, the combination of a hopper with a shaking-frame provided with a pivoted, counterbalanced, and yielding feeder-shelf, and with one or more adjustable shelves arranged beneath said feeder-shelf, substantially as and for the purpose described.

4. In a middlings-purifier or roller-mill, the combination of a hopper with a shaking-frame provided with an adjustable, counterbalanced, and yielding feeder-shelf, and with one or more adjustable shelves arranged beneath said pivoted shelf, substantially as and for the purpose described.

5. The combination, with a stationary hopper, of a counterbalanced and downwardly-yielding feeder-shelf for closing the discharge end of said hopper, and means for shaking or vibrating said shelf beneath the discharge end of said hopper, substantially as described.

6. The combination, with a stationary hopper, of an adjustable, counterbalanced, and downwardly-yielding feeder-shelf for closing the discharge end of said hopper, and means for shaking or vibrating said shelf beneath the discharge end of said hopper, substantially as described.

7. The combination of a stationary hopper, a vibrating or shaking frame provided with spreading-shelves and with a downwardly-yielding feeder-shelf pivoted in said frame and vibrating with it beneath the discharge end of said hopper, and counterbalancing devices, substantially as described.

8. The combination of a stationary hopper, a vibrating or shaking frame provided with spreading-shelves and with an adjustable downwardly-yielding feeder-shelf pivoted in said frame and vibrating with it beneath the discharge end of said hopper, and counterbalancing devices, substantially as described.

In testimony whereof I affix my signature in presence of two witnesses.

WILLIAM M. JEWELL.

Witnesses:

A. J. O'BRIEN,

J. B. WILLSEA.